United States Patent [19]

Hatanai

[11] Patent Number: 4,768,120
[45] Date of Patent: Aug. 30, 1988

[54] COMPLEX MAGNETIC HEAD HAVING NON-MAGNETIC CENTER CORE

[75] Inventor: Takashi Hatanai, Nagaoka, Japan

[73] Assignee: Alps Electric Co., Ltd., Japan

[21] Appl. No.: 81,307

[22] Filed: Aug. 3, 1987

[30] Foreign Application Priority Data

Sep. 8, 1986 [JP] Japan .................. 61-211234

[51] Int. Cl.⁴ .................. G11B 5/12; G11B 5/251; G11B 5/27
[52] U.S. Cl. .................. 360/121; 360/120
[58] Field of Search .................. 360/118–122

[56] References Cited

U.S. PATENT DOCUMENTS 4,149,204  4/1979  Marino et al. .................. 360/119
4,298,899  11/1981  Argumedo et al. .................. 360/122

FOREIGN PATENT DOCUMENTS 3602654  7/1986  Fed. Rep. of Germany ...... 360/127
58-19719A  2/1983  Japan .................. 29/603
58-169319A  10/1983  Japan .................. 360/121

Primary Examiner—John H. Wolff
Attorney, Agent, or Firm—Guy W. Shoup; Leighton K. Chong; Paul J. Winters

[57] ABSTRACT

A complex magnetic head includes a center core made from a non-magnetic material, interposing a magnetic film between the center core and a recording and reproducing core at one side of the center core and another magnetic film between the center core and an erasing core at the other side of the center core, so as to alleviate a cross-feed phenomenum between the recording and reproducing core and the erasing core through the center core.

1 Claim, 3 Drawing Sheets

COMPLEX MAGNETIC HEAD HAVING NON-MAGNETIC CENTER CORE

FIELD OF THE INVENTION

This invention relates to a complex magnetic head including a recording and reproducing core and an erasing core which are disposed to closely contact a disk-shaped magnetic recording medium to effect information recording or reproduction and erase recorded information, respectively.

BACKGROUND OF THE INVENTION

A prior art complex magnetic head of this type shown in FIG. 3 comprises a center core 11, a channel-shaped recording and reproducing core 12 and a channel-shaped erasing core 13 in which latter two members are disposed at opposite sides of the center core 11 so as to sandwich the center core 11, and they all are united together by glass or other adhesive material 14. The center core 11, recording and reproducing core 12 and erasing core 13 are made from a magnetic material respectively. A space between opposed surfaces of the center core 11 and the recording and reproducing core 12 is selectively padded with glass or other non-magnetic material to define a recording and reproducing gap 16. Similarly, a space between opposed surfaces of the center core 11 and the erasing core 13 is selectively padded with glass or other non-magnetic material to define an erasing gap 15. The magnetic core assembly is inserted in a slot 18 formed in a slider 17 shown in FIG. 5 and is fixed there by glass or synthetic resin. Coils (not shown) are wound on to the recording and reproducing core 12 and the erasing core 13, passing through coil holes 12a and 13a, respectively. One surface 19 of the slider 17 opposed to a magnetic recording medium is wrapped. Thus a complex floating type magnetic head is formed.

Magnetic recording mediums for which the complex, floating-type magnetic head is used have gradually been reduced in size from 3.5 inches through 3.0 inches to 2.5 inches. As shown in an enlarged view of FIG. 6, as the diameter of a magnetic recording medium 20 decreases, a difference is produced in a radially inward portion between an erased area A by the erasing gap 15 and a recorded area B by the recording and reproducing gap 16. The difference causes an excessive erasure or insufficient erasure on the magnetic recording medium, and invites a significant problem about the reliability of the magnetic head. In some cases, the difference will be eliminated by simply decreasing a gap distance L (FIG. 3) between the erasing gap 15 and the recording and reproducing gap 16. However, since the prior art complex magnetic head uses a magnetic material as the center core 11, a decrease in the gap distance L causes a so-called cross-feed phenomenum. That is, a magnetic field generated at the erasing gap 13 leaks to the recording and reproducing core 12 through the magnetic center core 11. Therefore, no significant decrease of the gap distance is expected in the prior art magnetic head.

OBJECT OF THE INVENTION

It is therefore an object of the invention to provide a complex magnetic head having a small inter-gap distance between both gaps but never inviting a large cross-feed caused by the decreased inter-gap distance.

SUMMARY OF THE INVENTION

The invention is based on a recognition that such a cross-feed is caused by the use of a magnetic material to form large part of the complex magnetic head, and that the problem can be overcome by using only a limited amount of a magnetic material in the form of a thin sheet and replacing the remainder of the magnetic material by a non-magnetic material.

More specifically, the invention is characterized in the use of a non-magnetic material to form the center core sandwiched by the recording and reproducing core and the erasing core, and the use of magnetic films interposed between the center core and both magnetic cores, defining the recording and reproducing gap and the erasing gap in spaces between the magnetic films and both magnetic cores.

DETAILED DESCRIPTION

Figure 1:
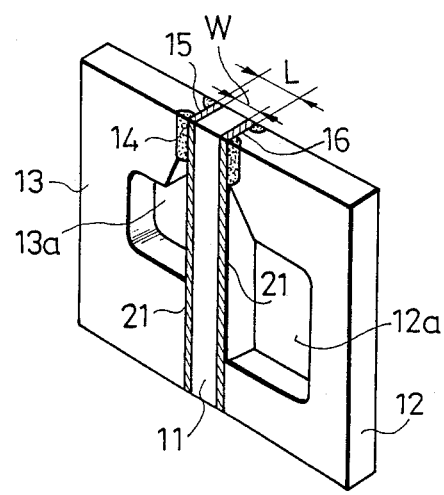
FIG. 1 is a perspective view showing a complex magnetic head embodying the invention.
Figure 2:
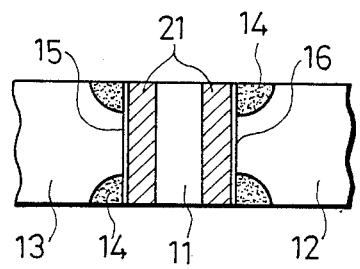
FIG. 2 is an enlarged plan view of a portion including gaps involved in FIG. 1.
Figure 3:
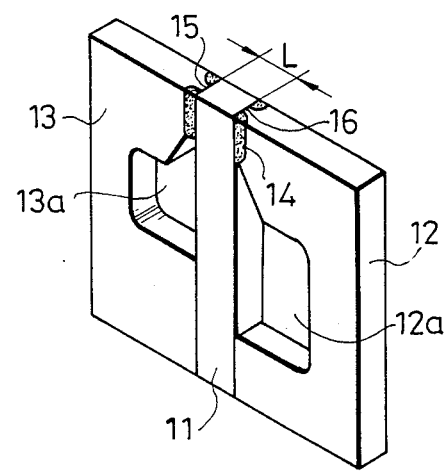
FIG. 3 is a perspective view of a prior art complex magnetic head.
Figure 4:
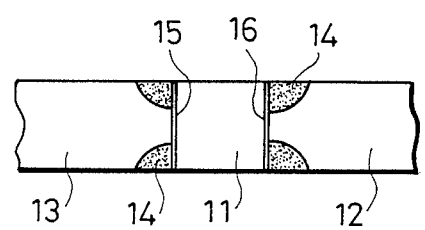
FIG. 4 is an enlarged plan view of FIG. 4 which shows a portion including gaps.
Figure 5:
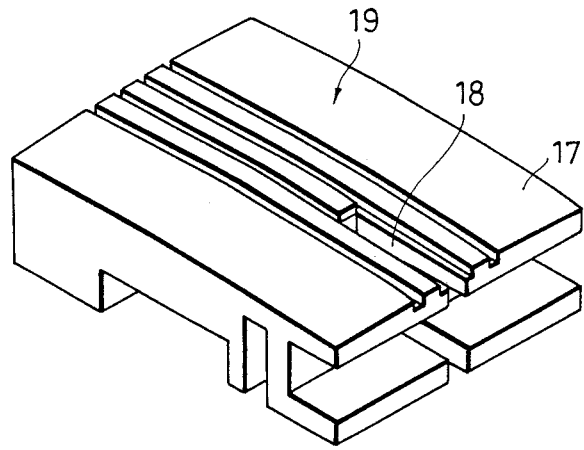
FIG. 5 is a perspective view of a slider to mount a magnetic head of this type thereon.
Figure 6:
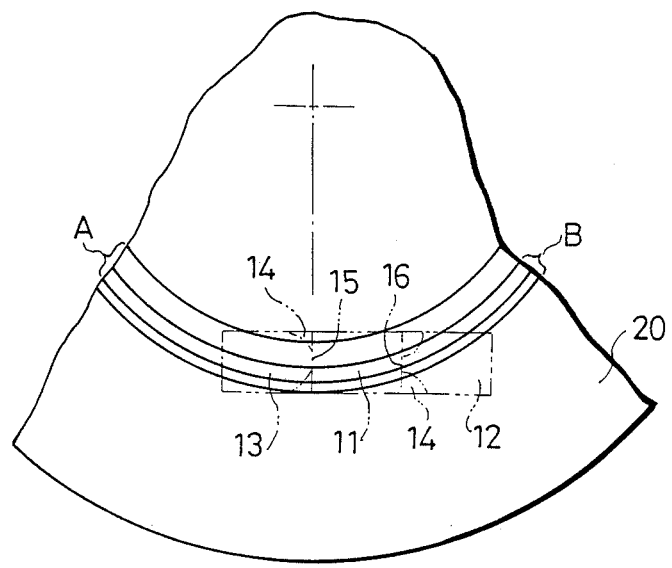
FIG. 6 is a schematic view for explaining problems involved in the prior art complex magnetic head.

The invention is described below, referring to a preferred embodiment illustrated in FIGS. 1 and 2. Members or parts in FIGS. 1 and 2 which are common to those in FIGS. 3 and 4 are designated by the same reference numerals, and their explanation is omitted below.

The invention uses ceramics, non-magnetic ferrite or other non-magnetic material to form the center core 11 which has been made from a magnetic material in the prior art magnetic head. To the center core 11 are opposed from its opposite sides the recording and reproducing core 12 and erasing core 13 both made from ferrite or other magnetic material. The invention device particularly features the use of magnetic films 21 interposed between the center core 11 and the recording and reproducing core 12 and between the center core 11 and the erasing core 13. The magnetic films 21 are made from Fe-Al-Si alloy, amorphous alloy, permalloy, etc, and are deposited on opposite surfaces of the center core 11 up to 10 to 20 $\mu$m thickness approximately by sputtering, vapor deposition, CVD or other suitable method. The magnetic films 21 serve as necessary magnetic portions of the center core 11. Each magnetic film 21 is selectively provided on its surface with $SiO_2$ or other substance by sputtering or other method to define a magnetic gap. The recording and reproducing core 12 and the erasing core 13 sandwich the center core 11 provided with the magnetic films 21 and are secured to the outer surfaces of the magnetic films 21 by glass or other fixing material 14. The erasing gap 15 and the recording and reproducing gap 16 are defined in spaces between the magnetic films 21 and both magnetic cores 12 and 13 by the aforegoing $SiO_2$ or other gap making material.

The magnetic core assembly consisting of the center core 11, magnetic films 21 and both magnetic cores 12 and 13 is mounted in the slot 18 of the slider 17, secured there by glass or other non-magnetic material, and provided with a wrapping covering its surface 19 to be opposed to a magnetic recording medium. In this fashion, a complex, floating-type magnetic head is completed. As a matter of course, coils (not shown) must be provided on the recording and reproducing core 12 and the erasing core 13, passing through their coil holes 12a and 13a.

With this arrangement, large part of the magnetic field generated at the erasing core 13 on occurrence of a cross-feed is blocked by the center core 11 made of a non-magnetic material. Therefore, the invention magnetic head assembly significantly restrains such a cross-feed phenomenum as compared with the prior art magnetic head of the same type. Therefore, the reliability of the magnetic head is greatly improved. Further, the inter-gap distance L may be adjusted by decreasing the width W of the center core 11.

As described above, the invention uses a non-magnetic material to make the center core to be adhesively united to the recording and reproducing core and the erasing core, and uses the magnetic films between the center core and both magnetic cores, defining the recording and reproducing gap and the erasing gap between the magnetic films and both magnetic cores. Therefore, large part of the magnetic field generated at the erasing core is blocked by the center core, so that the cross-feed problem is greatly decreased, and the reliability of the magnetic head of this type is significantly improved. Beside this, the invention arrangement makes it possible to reduce the inter-gap distance by decreasing the width of the center core. Further, since the head assembly has a simple arrangement including interposed magnetic films, the manufacturing process is never complicated.

What is claimed is:

1. In a complex magnetic head having a medium-contacting surface facing in a vertical direction toward a recording medium, of the type including a center core provided between a recording and reproducing core and an erasing core disposed on opposite side surfaces thereof in a lateral direction perpendicular to the vertical direction, wherein a recording and reproducing gap is defined between the side surfaces of the recording and reproducing core and the center core, and an erasing gap is defined between the side surfaces of the erasing core and the center core, the improvement wherein said center core is formed as a single block of non-magnetic material and has a magnetic film made from a metallic magnetic material formed on each of its opposite side surface facing the recording and reproducing gap and the erasing gap, respectively.

* * * * *